United States Patent
Su et al.

(10) Patent No.: US 9,521,563 B2
(45) Date of Patent: Dec. 13, 2016

(54) SYSTEM, APPARATUS, AND METHOD FOR CONTROLLING ACCESS TO MULTIPLE ANTENNAS IN MOBILE DEVICES HAVING MULTIPLE SIMS

(71) Applicant: Apple Inc., Cupertino, CA (US)

(72) Inventors: Li Su, San Jose, CA (US); Ming Hu, Sunnyvale, CA (US); Guojie Dong, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/693,563

(22) Filed: Apr. 22, 2015

(65) Prior Publication Data

US 2016/0316378 A1    Oct. 27, 2016

(51) Int. Cl.
*H04M 3/00* (2006.01)
*H04W 24/02* (2009.01)
*H04L 29/06* (2006.01)

(52) U.S. Cl.
CPC .............. *H04W 24/02* (2013.01); *H04L 69/18* (2013.01)

(58) Field of Classification Search
CPC ................................ H04W 24/02; H04L 69/18
See application file for complete search history.

(56) References Cited

U.S. PATENT DOCUMENTS

| | | | |
|---|---|---|---|
| 2013/0310035 A1 | 11/2013 | Gouriou et al. | |
| 2014/0194157 A1 | 7/2014 | Ezekiel et al. | |
| 2015/0282057 A1* | 10/2015 | Li | H04B 7/0871 455/552.1 |
| 2015/0289221 A1* | 10/2015 | Nayak | H04W 60/005 455/435.1 |

FOREIGN PATENT DOCUMENTS

GB    2512607    8/2014

* cited by examiner

*Primary Examiner* — Kashif Siddiqui
(74) *Attorney, Agent, or Firm* — Meyertons Hood Kivlin Kowert & Goetzel, P.C.; Jeffrey C. Hood; Joel L. Stevens

(57) ABSTRACT

Embodiments described herein relate to an apparatus, system, and method for controlling access to multiple antennas in a mobile device. The mobile device may determine priority among a first protocol stack associated with a first subscriber identity module (SIM) in the mobile device and a second protocol stack associated with a second SIM in the mobile device. The mobile device may lock control of a position of a switch to the first protocol stack based on determining the priority among the first protocol stack and the second protocol stack. The switch may control access to the multiple antennas. Accordingly, the second protocol stack may be unable to modify the position of the switch when control of the switch is locked to the first protocol stack.

19 Claims, 10 Drawing Sheets

SYSTEM, APPARATUS, AND METHOD FOR CONTROLLING ACCESS TO MULTIPLE ANTENNAS IN MOBILE DEVICES HAVING MULTIPLE SIMS

FIELD

The present application relates to the field of wireless communication, and more particularly to a system, apparatus, and method for switch control in mobile devices having multiple SIMs.

DESCRIPTION OF THE RELATED ART

Wireless communication systems are rapidly growing in usage. Further, wireless communication technology has evolved from voice-only communications to also include the transmission of data, such as Internet and multimedia content. As wireless communication systems evolve, successive generations of wireless communication technologies tend to be developed. Adoption of a new generation wireless technology may be a gradual process, during which one or more previous generations of a similar technology may co-exist with the new generation technology, e.g., for a period of time until the new generation wireless technology is fully deployed.

Some mobile devices have the capability of using multiple SIMs (subscriber identification modules), e.g., allowing users to maintain different wireless services, such as for business and personal use.

SUMMARY

Embodiments described herein relate to a system, apparatus, and method for controlling access to multiple antennas in a mobile device.

In some embodiments, the method may include determining priority among a first protocol stack associated with a first subscriber identity module (SIM) in the mobile device and a second protocol stack associated with a second SIM in the mobile device. The method may further include locking control of a position of a switch to the first protocol stack based on determining the priority among the first protocol stack and the second protocol stack. The switch may control access to the multiple antennas. Accordingly, the second protocol stack may be unable to modify the position of the switch when control of the switch is locked to the first protocol stack.

In some embodiments, the mobile device may include at least a first antenna and a second antenna, a first pair of receive radio frequency (RF) chains, including a first receive RF chain and a second receive RF chain, a second pair of receive RF chains, including a third receive RF chain and a fourth receive RF chain, a transmit RF chain, a switch having at least a first position and a second position, where the position of the switch controls coupling between the first pair of receive RF chains, the second pair of receive RF chains, the first antenna, and the second antenna, a first subscriber identity module (SIM), wherein a first protocol stack is associated with the first SIM, a second SIM, wherein a second protocol stack is associated with the second SIM, and a processing element coupled to the antennas, the RF chains, the switch, and the SIMs. The processing element may be configured to determine a type of communication associated with the first protocol stack and the second protocol stack. Additionally, based on the determined type of communication, during a first period of time, the processing element may be configured to allow the first protocol stack to modify the position of the switch while preventing the second protocol stack from modifying the position of the switch.

In some embodiments, a non-transitory, computer accessible memory medium may store program instructions. The program instructions may be executable to determine a mode of communication associated with a first protocol stack and a second protocol stack. The first protocol stack may be associated with a first subscriber identity module (SIM) of the mobile device and the second protocol stack may be associated with a second SIM. Based on the determined mode of communication, during a first period of time, the program instructions may be executable to allow the first protocol stack to modify the position of a switch while preventing the second protocol stack from modifying the position of the switch, where the position of the switch may control coupling between a first pair of receive chains, a second pair of receive chains, a first antenna, and a second antenna of the mobile device.

The techniques described herein may be implemented in and/or used with a number of different types of devices, including but not limited to cellular base stations, cellular phones, tablet computers, wearable computing devices, portable media players, and any of various other computing devices.

This Summary is provided for purposes of summarizing some exemplary embodiments to provide a basic understanding of aspects of the subject matter described herein. Accordingly, the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the preferred embodiment is considered in conjunction with the following drawings, in which.

Figure 1:
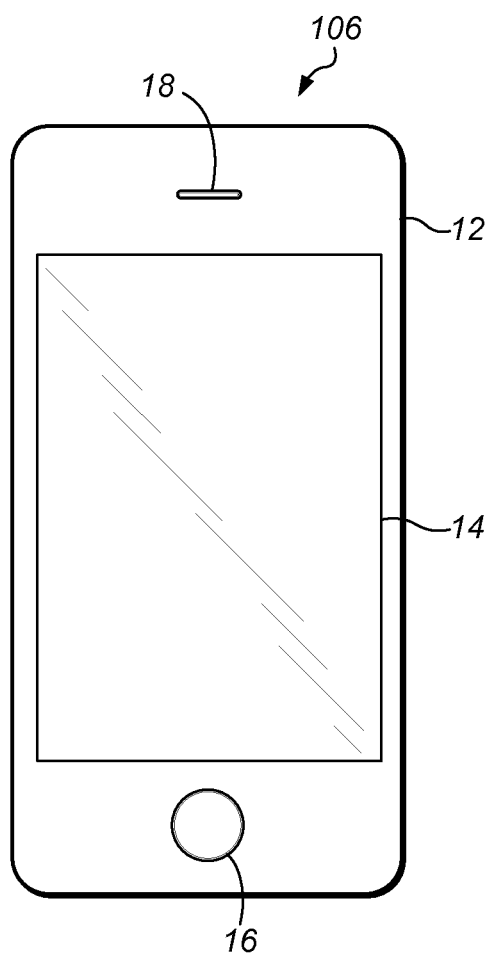
FIG. 1 illustrates an example mobile device, according to some embodiments.

While the features described herein are susceptible to various modifications and alternative forms, specific embodiments thereof are shown by way of example in the drawings and are herein described in detail. It should be understood, however, that the drawings and detailed description are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

The following acronyms are used in the present disclosure.

3GPP: Third Generation Partnership Project
3GPP2: Third Generation Partnership Project 2
GSM: Global System for Mobile Communications
UMTS: Universal Mobile Telecommunications System
TDS: Time Division Synchronous Code Division Multiple Access
LTE: Long Term Evolution
RAT: Radio Access Technology
TX: Transmit
RX: Receive

TERMS

The following is a glossary of terms used in the present application:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), personal communication device, smart phone, television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems or devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, PDAs, portable Internet devices, music players, data storage devices, other handheld devices, as well as wearable devices such as wrist-watches, headphones, pendants, earpieces, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

FIG. 1—User Equipment

FIG. 1 illustrates an example user equipment (UE) 106 according to one embodiment. The term UE 106 may be any of various devices as defined above. UE device 106 may include a housing 12 which may be constructed from any of various materials. UE 106 may have a display 14, which may be a touch screen that incorporates capacitive touch electrodes. Display 14 may be based on any of various display technologies. The housing 12 of the UE 106 may contain or comprise openings for any of various elements, such as home button 16, speaker port 18, and other elements (not shown), such as microphone, data port, and possibly various other types of buttons, e.g., volume buttons, ringer button, etc.

The UE 106 may support multiple radio access technologies (RATs). For example, UE 106 may be configured to communicate using any of various RATs such as two or more of Global System for Mobile Communications (GSM), Universal Mobile Telecommunications System (UMTS), Code Division Multiple Access (CDMA) (e.g., CDMA2000 1×RTT or other CDMA radio access technologies), Time Division Synchronous Code Division Multiple Access (TD-SCDMA or TDS), Long Term Evolution (LTE), Advanced LTE, and/or other RATs. For example, the UE 106 may support at three RATs, such as GSM, TDS, and LTE. Various different or other RATs may be supported as desired.

The UE 106 may comprise one or more antennas. The UE 106 may also comprise any of various radio configurations, such as various combinations of one or more transmitter chains (TX chains) and one or more receiver chains (RX chains). For example, the UE 106 may comprise a radio that supports two or more RATs. The radio may comprise a single TX (transmit) chain and a single RX (receive) chain. Alternatively, the radio may comprise a single TX chain and two RX chains, e.g., that operate on the same frequency. In another embodiment, the UE 106 comprises two or more radios, i.e., two or more TX/RX chains (two or more TX chains and two or more RX chains).

In the embodiment described herein, the UE 106 comprises two antennas which may be used to communicate using two or more RATs, e.g., using multiple SIMs. For example, the UE 106 may have a pair of cellular telephone antennas coupled to a single radio or shared radio. The antennas may be coupled to the shared radio (shared wireless communication circuitry) using switching circuits and other radio-frequency front-end circuitry. For example, the UE 106 may have a first antenna that is coupled to a transceiver or radio, i.e., a first antenna that is coupled to a transmitter chain (TX chain) for transmission and which is coupled to a first receiver chain (RX chain) for receiving. The UE 106 may also comprise a second antenna that is coupled to a second RX chain. The first and second receiver chains may share a common local oscillator, which means that both of the first and second receiver chains tune to the same frequency. The first and second receiver chains may be referred to as the primary receiver chain (PRX) and the diversity receiver chain (DRX).

In one embodiment, the PRX and DRX receiver chains operate as a pair and time multiplex among two or more RATs, such as GSM and TDS and/or LTE. In the primary embodiment described herein the UE 106 comprises one transmitter chain and two receiver chains (PRX and DRX), wherein the transmitter chain and the two receiver chains (acting as a pair) time multiplex between two (or more) RATs, such as GSM and TDS, and possibly LTE.

Each antenna may receive a wide range of frequencies such as from 600 MHz up to 3 GHz. Thus, for example, the local oscillator of the PRX and DRX receiver chains may tune to a specific frequency such as an LTE frequency band, where the PRX receiver chain receives samples from antenna 1 and the DRX receiver chain receives samples from antenna 2, both on the same frequency (since they use the same local oscillator). The wireless circuitry in the UE 106 can be configured in real time depending on the desired mode of operation for the UE 106. In the example embodiment described herein, the UE 106 is configured to support GSM and TDS radio access technologies.

Figure 2:
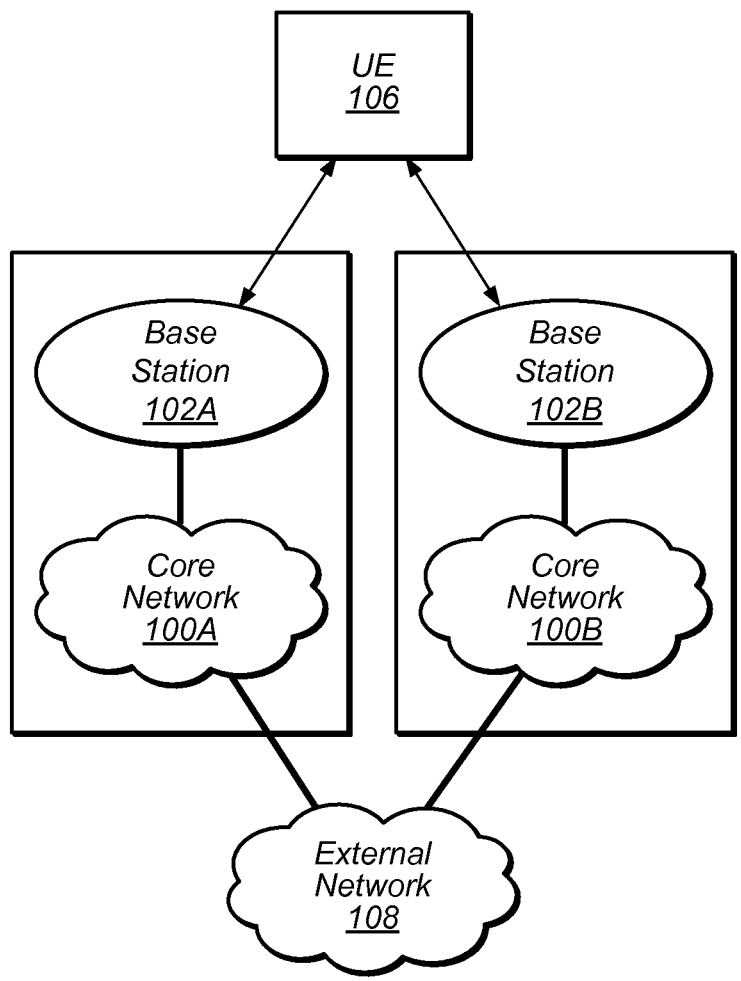
FIG. 2 illustrates an example wireless communication system, according to some embodiments.

FIG. 2—Communication System

FIG. 2 illustrates an exemplary (and simplified) wireless communication system. It is noted that the system of FIG. 2 is merely one example of a possible system, and embodiments may be implemented in any of various systems, as desired.

As shown, the exemplary wireless communication system includes base stations 102A and 102B which communicate over a transmission medium with one or more user equipment (UE) devices, represented as UE 106. The base stations 102 may be base transceiver stations (BTS) or cell sites, and may include hardware that enables wireless communication with the UE 106. Each base station 102 may also be equipped to communicate with a core network 100. For example, base station 102A may be coupled to core network 100A, while base station 102B may be coupled to core network 100B. Each core network may be operated by a respective cellular service provider, or the plurality of core networks 100A may be operated by the same cellular service provider. Each core network 100 may also be coupled to one or more external networks (such as external network 108), which may include the Internet, a Public Switched Telephone Network (PSTN), and/or any other network. Thus, the base stations 102 may facilitate communication between the UE devices 106 and/or between the UE devices 106 and the networks 100A, 100B, and 108.

The base stations 102 and the UEs 106 may be configured to communicate over the transmission medium using any of various radio access technologies ("RATs", also referred to as wireless communication technologies or telecommunication standards), such as GSM, UMTS (WCDMA), TDS, LTE, LTE Advanced (LTE-A), 3GPP2 CDMA2000 (e.g., 1×RTT, 1×EV-DO, HRPD, eHRPD), IEEE 802.11 (WLAN or Wi-Fi), IEEE 802.16 (WiMAX), etc.

Base station 102A and core network 100A may operate according to a first RAT (e.g., GSM) while base station 102B and core network 100B may operate according to a second (e.g., different) RAT (e.g., TDS, or other RATs). The two networks may be controlled by the same network operator (e.g., cellular service provider or "carrier"), or by different network operators, as desired. In addition, the two networks may be operated independently of one another (e.g., if they operate according to different RATs), or may be operated in a somewhat coupled or tightly coupled manner.

Note also that while two different networks may be used to support two different RATs, such as illustrated in the exemplary network configuration shown in FIG. 2, other network configurations implementing multiple RATs are also possible. As one example, base stations 102A and 102B might operate according to different RATs but couple to the same core network. As another example, multi-mode base stations capable of simultaneously supporting different RATs (e.g., GSM and TDS, LTE and TDS, LTE and GSM and TDS, and/or any other combination of RATs) might be coupled to a network or service provider that also supports the different cellular communication technologies.

As discussed above, UE 106 may be capable of communicating using multiple RATs, e.g., using multiple SIMs, such as those within 3GPP, 3GPP2, or any desired cellular standards. The UE 106 might also be configured to communicate using WLAN, Bluetooth, one or more global navigational satellite systems (GNSS, e.g., GPS or GLONASS), one and/or more mobile television broadcasting standards (e.g., ATSC-M/H or DVB-H), etc. Other combinations of network communication standards are also possible.

Base stations 102A and 102B and other base stations operating according to the same or different RATs or cellular communication standards may thus be provided as a network of cells, which may provide continuous or nearly continuous overlapping service to UE 106 and similar devices over a wide geographic area via one or more radio access technologies (RATs).

Figure 3:
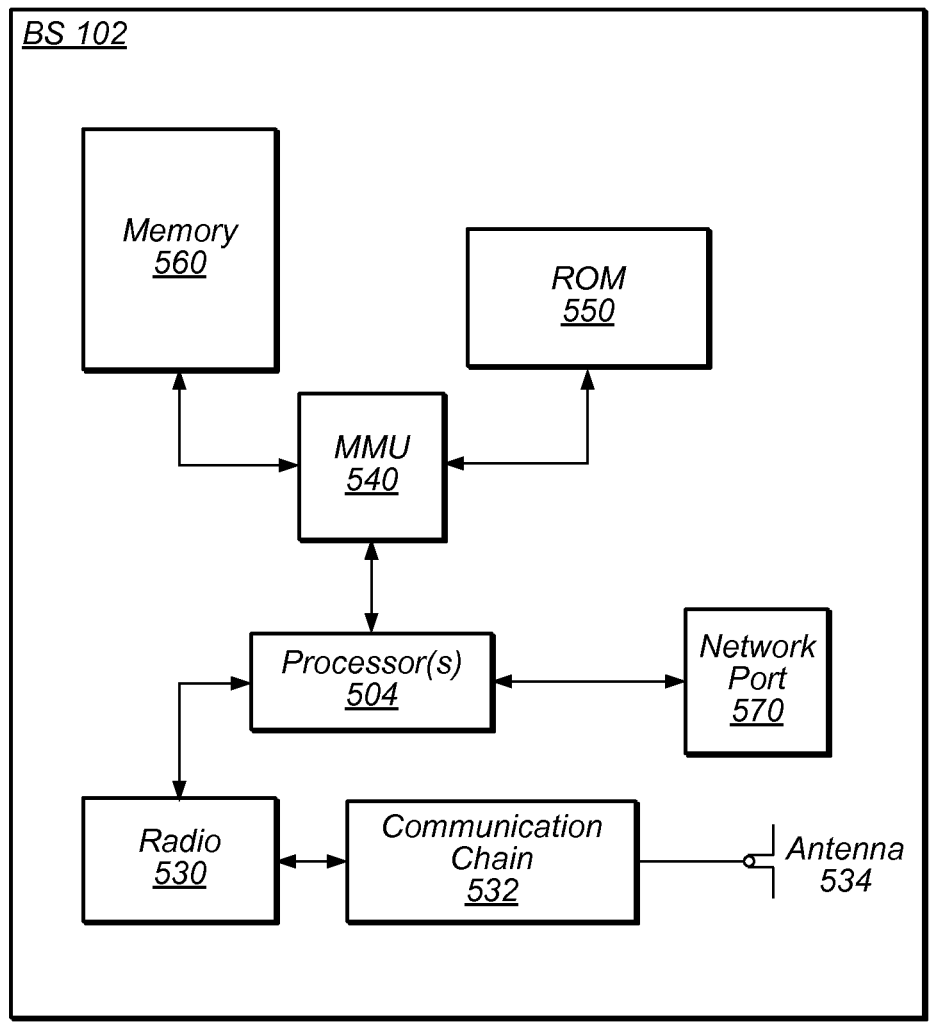
FIG. 3 is an example block diagram of a base station, according to some embodiments.

FIG. 3—Base Station

FIG. 3 illustrates an exemplary block diagram of a base station 102. It is noted that the base station of FIG. 3 is merely one example of a possible base station. As shown, the base station 102 may include processor(s) 504 which may execute program instructions for the base station 102. The processor(s) 504 may also be coupled to memory management unit (MMU) 540, which may be configured to receive addresses from the processor(s) 504 and translate those addresses to locations in memory (e.g., memory 560 and read only memory (ROM) 550) or to other circuits or devices.

The base station 102 may include at least one network port 570. The network port 570 may be configured to couple to a telephone network and provide a plurality of devices, such as UE devices 106, access to the telephone network as described above.

The network port 570 (or an additional network port) may also or alternatively be configured to couple to a cellular network, e.g., a core network of a cellular service provider. The core network may provide mobility related services and/or other services to a plurality of devices, such as UE devices 106. In some cases, the network port 570 may couple to a telephone network via the core network, and/or the core network may provide a telephone network (e.g., among other UE devices 106 serviced by the cellular service provider).

The base station 102 may include at least one antenna 534. The at least one antenna 534 may be configured to operate as a wireless transceiver and may be further configured to communicate with UE devices 106 via radio 530. The antenna 534 communicates with the radio 530 via communication chain 532. Communication chain 532 may be a receive chain, a transmit chain or both. The radio 530 may be configured to communicate via various RATs, including, but not limited to, LTE, GSM, TDS, WCDMA, CDMA2000, etc.

The processor(s) 504 of the base station 102 may be configured to implement part or all of the methods described herein, e.g., by executing program instructions stored on a memory medium (e.g., a non-transitory computer-readable memory medium). Alternatively, the processor 504 may be configured as a programmable hardware element, such as an FPGA (Field Programmable Gate Array), or as an ASIC (Application Specific Integrated Circuit), or a combination thereof.

Figure 4:
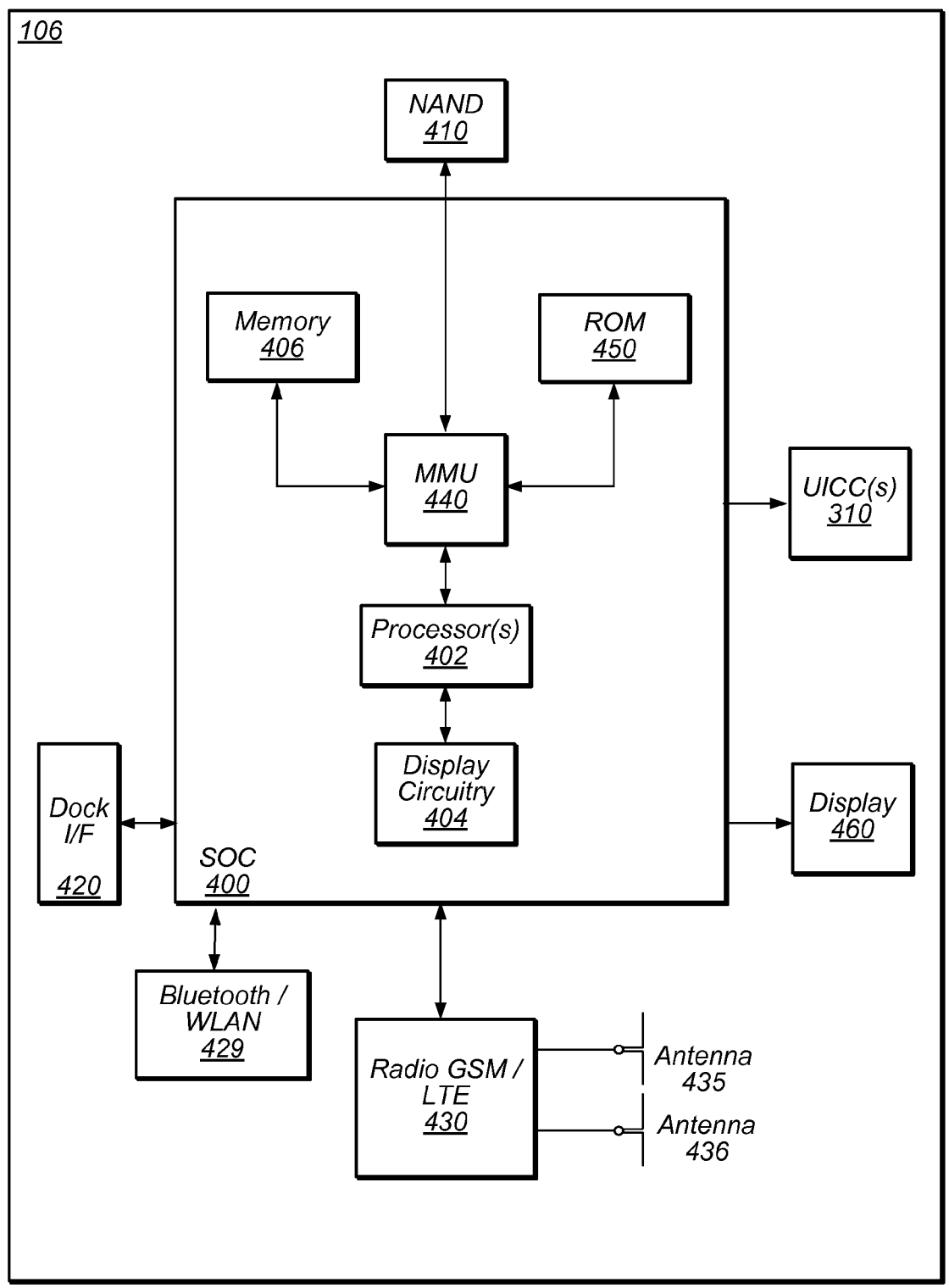
FIG. 4 is an example block diagram of a user equipment device, according to some embodiments.

FIG. 4—User Equipment (UE)

FIG. 4 illustrates an example simplified block diagram of a UE 106. As shown, the UE 106 may include a system on chip (SOC) 400, which may include portions for various purposes. The SOC 400 may be coupled to various other circuits of the UE 106. For example, the UE 106 may include various types of memory (e.g., including NAND flash 410), a connector interface 420 (e.g., for coupling to a computer system, dock, charging station, etc.), the display 460, cellular communication circuitry 430 such as for LTE, GSM, TDS, etc., and short range wireless communication circuitry 429 (e.g., Buletooth and WLAN circuitry). The UE 106 may further comprise one or more smart cards 310 that comprise SIM (Subscriber Identity Module) functionality, such as one or more UICC(s) (Universal Integrated Circuit Card(s)) cards 310. The cellular communication circuitry 430 may couple to one or more antennas, preferably two antennas 435 and 436 as shown. The short range wireless communication circuitry 429 may also couple to one or both of the antennas 435 and 436 (this connectivity is not shown for ease of illustration).

As shown, the SOC 400 may include processor(s) 402 which may execute program instructions for the UE 106 and display circuitry 404 which may perform graphics processing and provide display signals to the display 460. The processor(s) 402 may also be coupled to memory management unit (MMU) 440, which may be configured to receive addresses from the processor(s) 402 and translate those addresses to locations in memory (e.g., memory 406, read only memory (ROM) 450, NAND flash memory 410) and/or to other circuits or devices, such as the display circuitry 404, cellular communication circuitry 430, short range wireless communication circuitry 429, connector I/F 420, and/or display 460. The MMU 440 may be configured to perform memory protection and page table translation or set up. In some embodiments, the MMU 440 may be included as a portion of the processor(s) 402.

In one embodiment, as noted above, the UE 106 comprises at least one smart card 310, such as a UICC 310, which executes one or more Subscriber Identity Module (SIM) applications and/or otherwise implement SIM functionality. The at least one smart card 310 may be only a single smart card 310, or the UE 106 may comprise two or more smart cards 310. Each smart card 310 may be embedded, e.g., may be soldered onto a circuit board in the UE 106, or each smart card 310 may be implemented as a removable smart card. Thus the smart card(s) 310 may be one or more removable smart cards (such as UICC cards, which are sometimes referred to as "SIM cards"), and/or the smart card(s) 310 may be one or more embedded cards (such as embedded UICCs (eUICCs), which are sometimes referred to as "eSIMs" or "eSIM cards"). In some embodiments (such as when the smart card(s) 310 include an eUICC), one or more of the smart card(s) 310 may implement embedded SIM (eSIM) functionality; in such an embodiment, a single one of the smart card(s) 310 may execute multiple SIM applications. Each of the smart card(s) 310 may include components such as a processor and a memory; instructions for performing SIM/eSIM functionality may be stored in the memory and executed by the processor. In one embodiment, the UE 106 may comprise a combination of removable smart cards and fixed/non-removable smart cards (such as one or more eUICC cards that implement eSIM functionality), as desired. For example, the UE 106 may comprise two embedded smart cards 310, two removable smart cards 310, or a combination of one embedded smart card 310 and one removable smart card 310. Various other SIM configurations are also contemplated.

As noted above, in one embodiment, the UE 106 comprises two or more smart cards 310, each implementing SIM functionality. The inclusion of two or more SIM smart cards 310 in the UE 106 may allow the UE 106 to support two different telephone numbers and may allow the UE 106 to communicate on corresponding two or more respective networks. For example, a first smart card 310 may comprise SIM functionality to support a first RAT such as GSM, and a second smart card 310 may comprise SIM functionality to support a second RAT such as TDS. Other implementations and RATs are of course possible. Where the UE 106 comprises two smart cards 310, the UE 106 may support Dual SIM Dual Active (DSDA) functionality. The DSDA functionality may allow the UE 106 to be simultaneously connected to two networks (e.g., and use two different RATs) at the same time. The DSDA functionality may also allow the UE 106 may to simultaneously receive voice calls or data traffic on either phone number. In another embodiment, the UE 106 supports Dual SIM Dual Standby (DSDS) functionality. The DSDS functionality may allow either of the two smart cards 310 in the UE 106 to be on standby waiting for a voice call and/or data connection. In DSDS, when a call/data is established on one SIM 310, the other SIM 310 is no longer active. In one embodiment, DSDx functionality (either DSDA or DSDS functionality) may be implemented with a single smart card (e.g., a eUICC) that executes multiple SIM applications for different carriers and/or RATs.

As noted above, the UE 106 may be configured to communicate wirelessly using multiple radio access technologies (RATs). As further noted above, in such instances, the cellular communication circuitry (radio(s)) 430 may include radio components which are shared between multiple RATS and/or radio components which are configured exclusively for use according to a single RAT. Where the UE 106 comprises at least two antennas, the antennas 435 and 436 may be configurable for implementing MIMO (multiple input multiple output) communication.

As described herein, the UE 106 may include hardware and software components for implementing features for communicating using two or more RATs, such as those described herein. The processor 402 of the UE device 106 may be configured to implement part or all of the features described herein, e.g., by executing program instructions stored on a memory medium (e.g., a non-transitory computer-readable memory medium). Alternatively (or in addition), processor 402 may be configured as a programmable hardware element, such as an FPGA (Field Programmable Gate Array), or as an ASIC (Application Specific Integrated Circuit). Alternatively (or in addition) the processor 402 of the UE device 106, in conjunction with one or more of the other components 400, 404, 406, 410, 420, 430, 435, 440, 450, 460 may be configured to implement part or all of the features described herein.

Figure 5A:
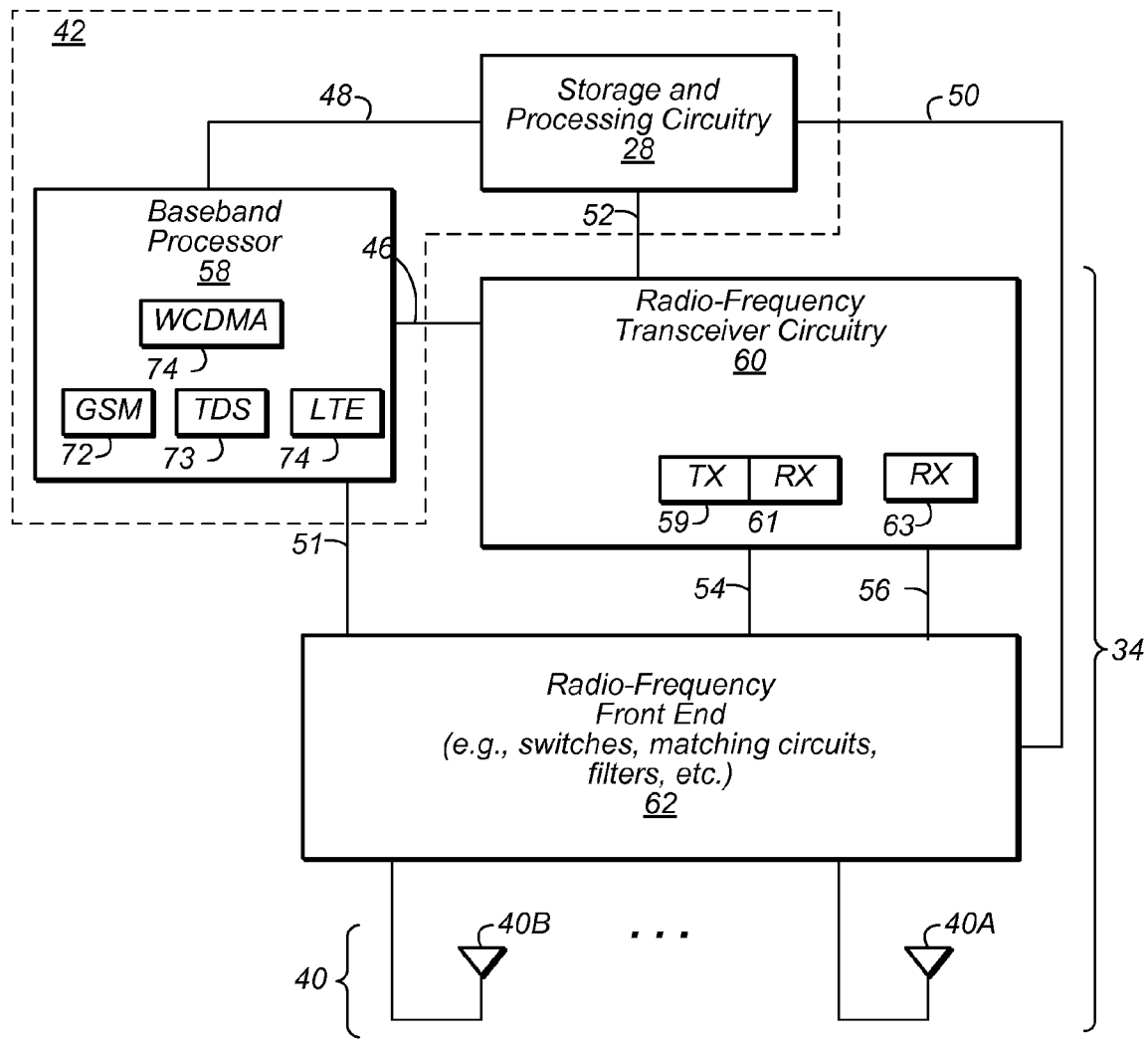
FIGS. 5A and 5B are example block diagrams of wireless communication circuitry, according to some embodiments.
Figure 5B:
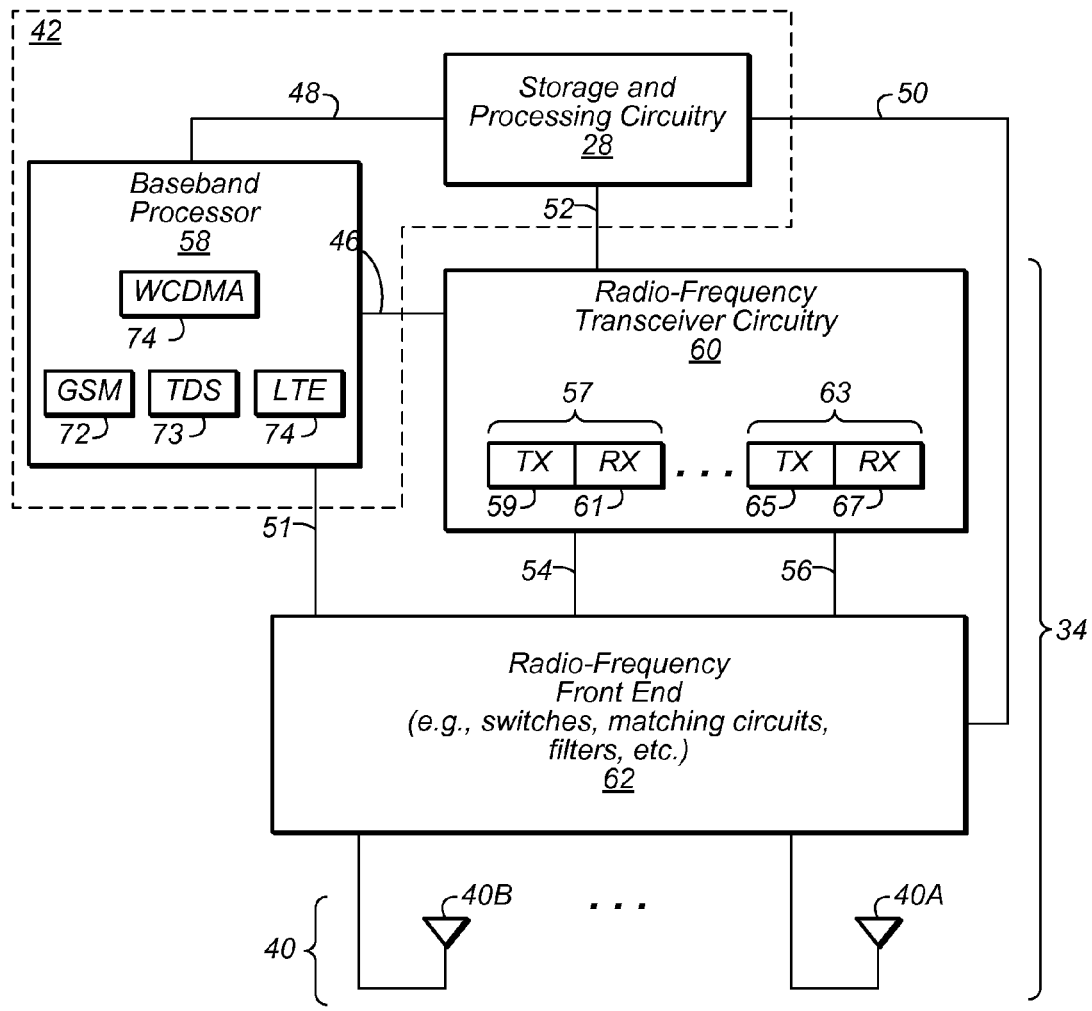

FIGS. 5A and 5B—UE Transmit/Receive Logic

FIG. 5A illustrates a portion of UE 106 according to one embodiment. As shown, UE 106 may comprise control circuitry 42 that is configured to store and execute control code for implementing control algorithms in the UE 106. Control circuitry 42 may include storage and processing circuitry 28 (e.g., a microprocessor, memory circuits, etc.) and may include baseband processor integrated circuit 58. Baseband processor 58 may form part of wireless circuitry 34 and may include memory and processing circuits (i.e., baseband processor 58 may be considered to form part of the storage and processing circuitry of UE 106). Baseband processor 58 may comprise software and/or logic for handling various different RATs, such as GSM logic 72, TDS logic 73, LTE logic 74, WCDMA logic 75, among others.

Baseband processor 58 may provide data to storage and processing circuitry 28 (e.g., a microprocessor, nonvolatile memory, volatile memory, other control circuits, etc.) via path 48. The data on path 48 may include raw and processed data associated with UE cellular communications and operations, such as cellular communication data, wireless (antenna) performance metrics for received signals, information related to tune-away operations, information related to paging operations, etc. This information may be analyzed by storage and processing circuitry 28 and/or processor 58 and, in response, storage and processing circuitry 28 (or, if desired, baseband processor 58) may issue control commands for controlling wireless circuitry 34. For example, storage and processing circuitry 28 may issue control commands on path 52 and path 50 and/or baseband processor 58 may issue commands on path 46 and path 51.

Wireless circuitry 34 may include radio-frequency transceiver circuitry such as radio-frequency transceiver circuitry 60 and radio-frequency front-end circuitry 62. Radio-frequency transceiver circuitry 60 may include one or more radio-frequency transceivers. In the embodiment shown radio-frequency transceiver circuitry 60 comprises transceiver (TX) chain 59, receiver (RX) chain 61 and RX chain 63. As noted above, the two RX chains 61 and 63 may be a primary RX chain 61 and a diversity RX chain 63. The two RX chains 61 and 63 may be connected to the same local oscillator (LO) and thus may operate together at the same frequency for MIMO operations. Thus the TX chain 59 and the two RX chains 61 and 63 may be considered, along with other necessary circuitry, as a single radio. Other embodiments are of course contemplated. For example, the radio-frequency transceiver circuitry 60 may comprise only a single TX chain and only a single RX chain, also a single radio embodiment. Thus the term "radio" may be defined to have the broadest scope of its ordinary and accepted meaning, and comprises the circuitry normally found in a radio, including either a single TX chain and a single RX chain or a single TX chain and two (or more) RX chains, e.g., connected to the same LO. The term radio may encompass the transmit and receive chains discussed above and may also include digital signal processing coupled to the radio frequency circuitry (e.g., the transmit and receive chains) associated with performing wireless communication. As one example, the transmit chain may include such components as amplifier, mixer, filter, and digital analog converter. Similarly, the receive chain(s) may include, e.g., such components as amplifier, mixer, filter, and analog to digital converter. As mentioned above, multiple receive chains may share a LO, although in other embodiments, they may comprise their own LO. Wireless communication circuitry may encompass a larger set of components, e.g., including one or more radios of the UE (transmit/receive chains and/or digital signal processing), baseband processors, etc. The term "cellular wireless communication circuitry" includes various circuitry for performing cellular communication, e.g., as opposed to other protocols that are not cellular in nature, such as Bluetooth. Certain embodiments of the invention described herein may operate to improve performance when a single radio (i.e., a radio with a single TX chain and single RX chain; or a radio with a single TX chain and two RX chains, where the two RX chains are connected to the same LO) supports multiple RATs.

As shown in FIG. 5B, the radio-frequency transceiver circuitry 60 may also comprise two or more TX chains and two or more RX chains. For example, FIG. 5B shows an embodiment with a first radio 57 comprising TX chain 59 and RX chain 61 and a second radio 63 comprising a first TX chain 65 and a second TX chain 67. Embodiments are also contemplated where additional TX/RX receive chains may be included in the embodiment of FIG. 5A, i.e., in addition to the one TX chain 59 and two RX chains 61 and 63 shown. In these embodiments that have multiple TX and RX chains, when only one radio is currently active, e.g., the second radio is turned off to save power, certain embodiments of the invention described herein may operate to improve performance of the single active radio when it supports multiple RATs.

Baseband processor 58 may receive digital data that is to be transmitted from storage and processing circuitry 28 and may use path 46 and radio-frequency transceiver circuitry 60 to transmit corresponding radio-frequency signals. Radio-frequency front end 62 may be coupled between radio-frequency transceiver 60 and antennas 40 and may be used to convey the radio-frequency signals that are produced by radio-frequency transceiver circuitry 60 to antennas 40. Radio-frequency front end 62 may include radio-frequency switches, impedance matching circuits, filters, and other circuitry for forming an interface between antennas 40 and radio-frequency transceiver 60.

Incoming radio-frequency signals that are received by antennas 40 may be provided to baseband processor 58 via radio-frequency front end 62, paths such as paths 54 and 56, receiver circuitry in radio-frequency transceiver 60, and paths such as path 46. Path 54 may, for example, be used in handling signals associated with transceiver 57, whereas path 56 may be used in handling signals associated with transceiver 63. Baseband processor 58 may convert received signals into digital data that is provided to storage and processing circuitry 28. Baseband processor 58 may also extract information from received signals that is indicative of signal quality for the channel to which the transceiver is currently tuned. For example, baseband processor 58 and/or other circuitry in control circuitry 42 may analyze received signals to produce various measurements, such as bit error rate measurements, measurements on the amount of power associated with incoming wireless signals, strength indicator (RSSI) information, received signal code power (RSCP) information, reference symbol received power (RSRP) information, signal-to-interference ratio (SINR) information, signal-to-noise ratio (SNR) information, channel quality measurements based on signal quality data such as Echo or Ec/No data, etc.

Radio-frequency front end 62 may include switching circuitry. The switching circuitry may be configured by control signals received from control circuitry 42 (e.g., control signals from storage and processing circuitry 28 via path 50 and/or control signals from baseband processor 58 via path 51). The switching circuitry may include a switch (switch circuit) that is used to connect TX and RX chain(s) to antennas 40A and 40B. Radio-frequency transceiver circuitry 60 may be configured by control signals received from storage and processing circuitry over path 52 and/or control signals received from baseband processor 58 over path 46.

The number of antennas that are used may depend on the operating mode for UE 106. For example, as shown in FIG. 5A, in normal LTE operations, antennas 40A and 40B may be used with respective receivers 61 and 63 to implement a receive diversity scheme, such as for MIMO operations. With this type of arrangement, two LTE data streams may be simultaneously received and processed using baseband processor 58. When it is desired to monitor a GSM paging channel for incoming GSM pages, one or both of the antennas may be temporarily used in receiving GSM paging channel signals.

Control circuitry 42 may be used to execute software for handling more than one radio access technology. For example, baseband processor 58 may include memory and control circuitry for implementing multiple protocol stacks such as a GSM protocol stack 72, a TDS protocol stack 73, an LTE protocol stack 74, and a WCDMA protocol stack 75. Thus, protocol stack 72 may be associated with a first RAT such as GSM (as an example), protocol stack 73 may be associated with a second RAT such as TDS, protocol stack 74 may be associated with a third RAT such as LTE, and protocol stack 75 may be associated with a fourth RAT such as WCDMA (as an example). During operation, UE 106 may use GSM protocol stack 72 to handle GSM functions, TDS protocol stack 73 to handle TDS functions, LTE protocol stack 74 to handle LTE functions, and WCDMA protocol stack 75 to handle WCDMA functions. Additional protocol stacks, additional transceivers, additional antennas 40, and other additional hardware and/or software may be used in UE 106 if desired. The arrangement of FIGS. 5A and 5B is merely illustrative. In one embodiment, one or both of the protocol stacks may be configured to implement the methods described in the flowcharts below.

In one embodiment of FIG. 5A (or 5B), the cost and complexity of UE 106 may be minimized by implementing the wireless circuitry of FIG. 5A (or 5B) using an arrangement in which baseband processor 58 and radio-transceiver circuitry 60 are used to support GSM, TDS, and LTE traffic, although other embodiments are envisioned which use more than one radio and/or further radio frequency circuitry.

The GSM radio access technology may generally be used to carry voice traffic, whereas the LTE radio access technology may generally be used to carry data traffic. To ensure that GSM voice calls are not interrupted due to LTE data traffic, GSM operations may take priority over LTE operations. To ensure that operations such as monitoring a GSM paging channel for incoming paging signals do not unnecessarily disrupt LTE operations, control circuitry 42 can, whenever possible, configure the wireless circuitry of UE 106 so that wireless resources are shared between LTE and GSM functions. Similar remarks apply to combinations of TDS and LTE and GSM and TDS.

When a user has an incoming GSM call, the GSM network may send UE 106 a paging signal (sometimes referred to as a page) on the GSM paging channel using base station 102. When UE 106 detects an incoming page, UE 106 can take suitable actions (e.g., call establishment procedures) to set up and receive the incoming GSM call. Pages are typically sent several times at fixed intervals by the network, so that devices such as UE 106 will have multiple opportunities to successfully receive a page.

Proper GSM page reception may require that the wireless circuitry of UE 106 be periodically tuned to the GSM paging channel, referred to as a tune-away operation. If the transceiver circuitry 60 fails to tune to the GSM paging channel or if the GSM protocol stack 72 in baseband processor 58 fails to monitor the paging channel for incoming pages, GSM pages will be missed. On the other hand, excessive monitoring of the GSM paging channel may have an adverse impact on an active LTE data session. Embodiments of the invention may comprise improved methods for handling tune-away operations, as described below.

In some embodiments, in order for the UE 106 to conserve power, the GSM, TDS, and LTE protocol stacks 72, 73, 74, and 75 may support idle mode operations. Also, one or multiple of the protocol stacks 72-75 may support a discontinuous reception (DRX) mode and/or a connected discontinuous reception (CDRX) mode. DRX mode refers to a mode which powers down at least a portion of UE circuitry when there is no data (or voice) to be received. In DRX and CRDX modes, the UE 106 synchronizes with the base station 102 and wakes up at specified times or intervals to listen to the network. DRX is present in several wireless standards such as UMTS, LTE (Long-term evolution), WiMAX, etc. The terms "idle mode", "DRX" and "CDRX" are explicitly intended to at least include the full extent of their ordinary meaning, and are intended to encompass similar types of modes in future standards.

Switch Control in Mobile Devices Having Multiple SIMs

Figure 6A:
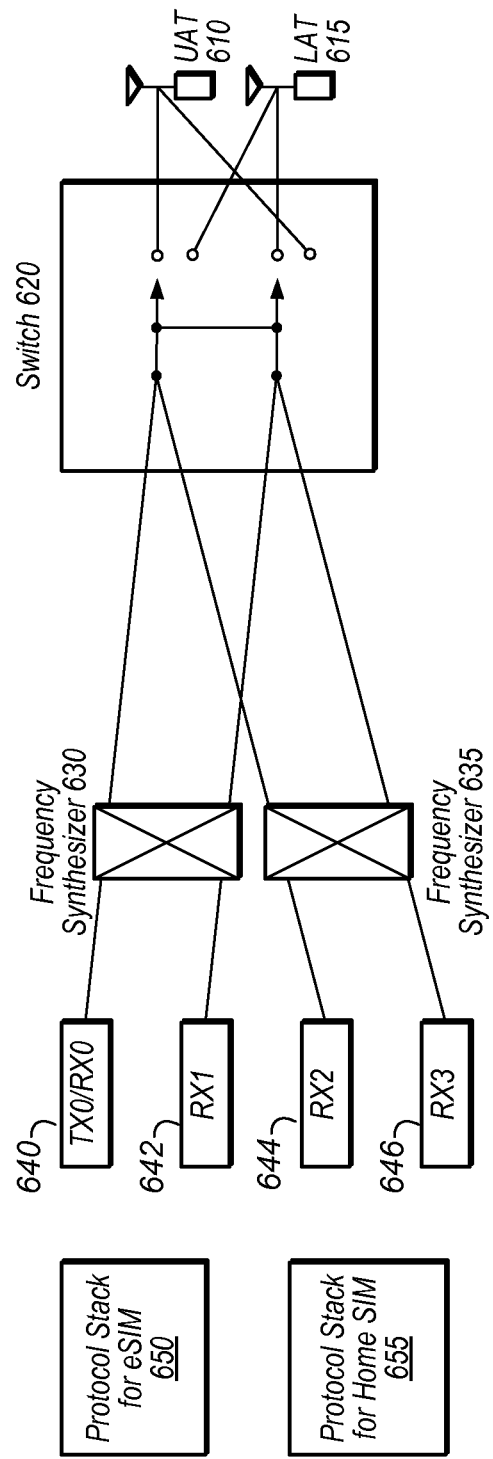
FIGS. 6A-6C are example diagrams illustrating RF switching within wireless communication circuitry, according to some embodiments.
Figure 6B:
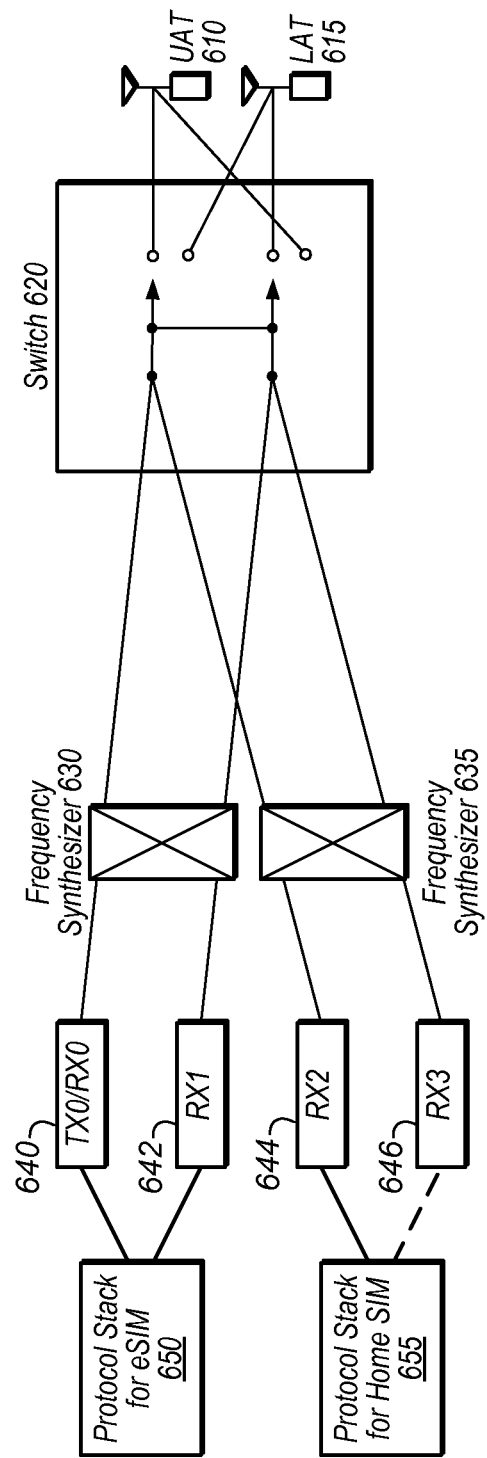
Figure 6C:
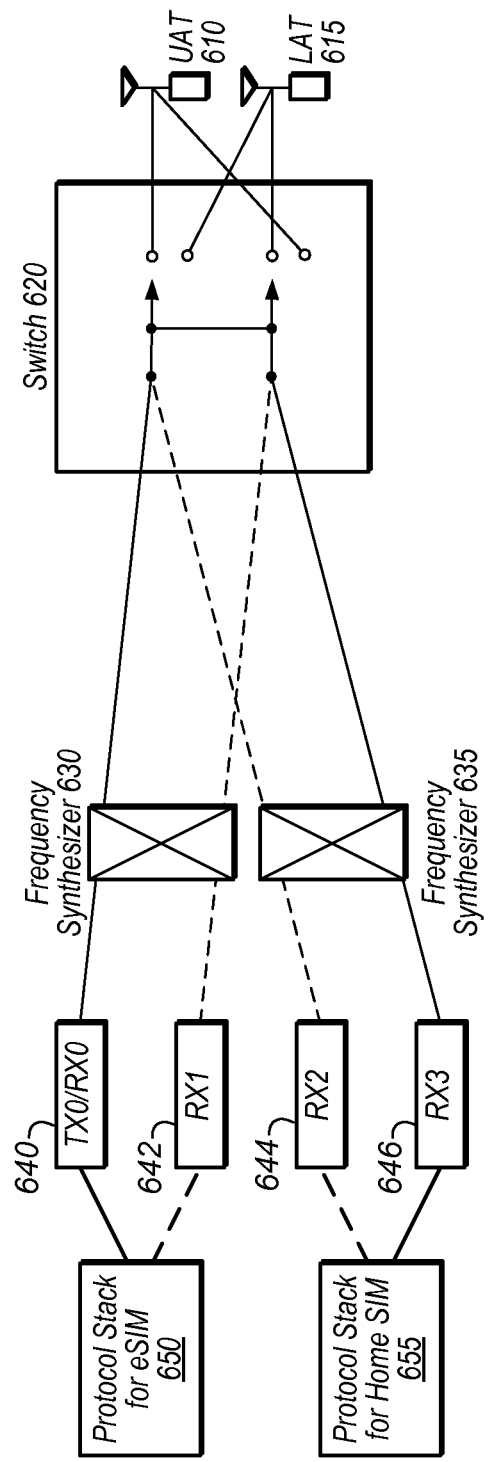

As discussed above, the mobile device 106 may include antennas 435 and 436. In some embodiments, the two antennas may be referred to as upper antenna (UAT) 610 and lower antenna (LAT) 615. In FIGS. 6A-6C, the mobile device 106 may further include two frequency synthesizers 630 and 635 which may receive RF signals from the antennas for further processing in the RF processing chain. The mobile device 106 may further include two pairs of receive RF processing chains—RX0 (640) and RX1 (642) and Rx2 (644) and Rx3 (646). The mobile device 106 may also include a transmit RF chain (TX0) which may be bound with RX0 as TRX0 (640), although other pairings are also envisioned. The mobile device may also include protocol stacks 650 and 655, e.g., which may each be associated with SIMs of the mobile device.

In the exemplary configuration shown, TRX0 640 and RX1 642 are connected to synthesizer 630, RX2 644 and RX3 646 are connected to synthesizer 635, synthesizer 630 is connected to both UAT 610 and LAT 615, synthesizer 635 is also connected to both UAT 610 and LAT 615, and there is a two-way switch 620 between the synthesizers 630 and 635 and antennas 610 and 615. When switch 620 is in a first position, TRX0 640 and RX2 644 are linked to UAT 610, while RX1 642 and RX3 646 are linked to LAT 615. When switch 620 is in a second position, TRX0 640 and RX2 644 are linked to LAT 615, while RX1 642 and RX3 644 are linked to UAT 610.

In addition, protocol stacks 650 (e.g., for eSIM in the embodiment shown) and 655 (e.g., for home SIM in the embodiment shown) may utilize TRX0 640, RX1 642, RX2 644, and RX3 646 in various different configurations, such as those discussed below. Note that while eSIM and home SIMs are shown in FIGS. 6A-6C various combinations of SIM types are contemplated. In some embodiments, protocol stacks 650 and 655 may be configured to perform multi-RAT communication (e.g., LTE, WCDMA, TDS, GSM, CDMA (1x and/or DO), etc.). Accordingly, when mobile device 106 communicates without using both SIMs, e.g., using protocol stack 650 or 655 only, the RF hardware configuration may be fully controlled by the RAT in use via a single protocol stack. For example, the controlling stack may communicate using a first RAT and may measure and compare RF signal quality received from UAT 610 and LAT 615. By controlling the position of switch 620, the controlling stack may ensure TRX0 connects to the antenna with best results (between UAT 610 and LAT 615).

In DSDS phone configurations, both SIMs of the mobile device or UE may be used, e.g., an eSIM associated with protocol stack 650 and a physical SIM associated with protocol stack 655. Both protocol stacks can be in multi-RAT mode (e.g., LTE, WCDMA, TDS, GSM, CDMA (1x and/or DO), etc.), if desired. Both stacks can be in idle DRX monitoring pages for circuit switched and/or packet switched calls, or one may be performing a data call, while the other one is in idle DRX, among other possible scenarios. Whenever one stack is involved in a voice call, e.g., a circuit switched voice call, the other stack may be suspended until the voice call is completed. Note that the single TX may be used by both stacks, e.g., each stack may fully control the TX when it is allocated a dedicated channel, until it is released.

In some embodiments, the RF hardware may be shared by two simultaneously active protocol stacks (650 and 655). While both are simultaneously active, the stacks may operate in a full parallel mode, e.g., where TRX0 640 and RX1 642 are allocated to protocol stack 650 (which can be in any RAT in multi-RAT mode) and RX2 644 and RX3 644 are allocated to protocol stack 655 (which can also be in any RAT in multi-RAT mode). Alternatively, the stacks may operate in a diversity sharing mode, e.g., where TRX0 640 is allocated to protocol stack 650, RX1 642 is allocated to protocol stack 655, and TRX0 640 is connected to UAT 610 (or LAT 615) and RX1 is connected to LAT 615 (or UAT 610), respectively. As mentioned previously, both stacks can be in any RAT, as desired.

In both of these modes, both protocol stacks can measure and evaluate RF signal qualities from both antennas. It is possible that both stacks may elect to change the position of the switch 620. However, this could cause performance issues if both stacks make different decisions during communication sessions.

Accordingly, in some embodiments, a lock may be introduced for the switch 620. In some embodiments, when locked (or when a lock state is activated), the position of switch 620 cannot be changed until it is unlocked by the same stack. The protocol stack providing a higher priority service may have access to the switch (and the lock) over other protocol stack(s). For example, if one stack is in an active voice call while the other is in an active data session, the voice service may have higher priority than the data session. As another example, if one stack is involved in a circuit switched call while the other is involved in a packet switched call, the stack associated with the circuit switched call may have priority or control of the lock. As another example, if a stack is in idle DRX mode monitoring for circuit switched pages, it may have priority over another stack in idle DRX mode monitoring for packet switched pages. As a further example, if a stack is in idle mode, e.g., monitoring for circuit-switched pages, it may have a higher priority than another stack involved in data service (e.g., in an active packet-switched data session).

In particular, in some embodiments, if a first stack is involved in a voice call, it may have full control of the switch 620 until the voice call is released. Similarly, if a first stack is in idle DRX mode monitoring for circuit switched pages, when it wakes up for performing page checking and the switch 620 is not locked, it may change the position of the switch and/or lock the switch 620 in order to use the best antenna to check for incoming pages. The first stack may then unlock the switch 620 after completing page monitoring, e.g., when it goes back to sleep. If both stacks are either involved in data calls or in idle DRX mode for packet switched page monitoring (or generally have equal priority), switch control (e.g., ability to lock the position of the switch) may be alternated between the two stacks, such as in a round robin fashion.

As another example, if one stack is in a RAT mode which does not use two RX receiving chains (e.g., no diversity or MIMO), e.g., if a first stack is in multi-RAT mode while a second stack is in idle DRX mode, the first stack may measure and evaluate the best antenna between UAT 610 and LAT 615 based on received RF signals from both antennas. Accordingly, when the second stack wakes up from idle DRX, it may choose the best antenna to use based on the first stack's measurement and evaluation until going back to sleep.

Various ones of the examples above may be useful while the mobile device 106 operates in full parallel or concurrency mode. The following examples may be useful while the mobile device 106 operates in diversity mode, although some may be applicable to both modes. In one example, a first stack may be in a packet-switched, data call or in idle DRX, monitoring for packet switched pages, while the other is in DRX, monitoring for circuit switched pages. Accordingly, during the DRX period of the second stack, the first stack may control both RX0 640 and RX1 642 (and potentially both RX2 644 and RX3 646 if performing carrier aggregation). The first stack may measure and evaluate the best antenna between UAT 610 and LAT 615 based on received RF signals from both antennas. Accordingly, when the second stack wakes up from DRX, it may choose the best antenna to use based on the first stack's measurement and evaluation until it goes back to DRX sleep.

By using the locking discussed above, the performance of the higher priority service may be ensured (e.g., voice call performance while operating in DSDS modes). Additionally, in case the best antenna is locked for a first stack (e.g., performing circuit switched page monitoring on one SIM), but it is not the best antenna for a second stack (e.g., for performing packet switched data communication on the other SIM), the lower performance for the second stack may only be for a short period of time (e.g., during the period of time of circuit switched page monitoring). Additionally, the potential data loss due to not using the best antenna may be recovered by a retransmission mechanism built into packet switched service, such as HARQ and RLC retransmission.

Carrier Aggregation

In some embodiments, the mobile device 106 may be configured to perform carrier aggregation, e.g., using a combination of eSIM bands (e.g., PCC (primary carrier component) bands in an LTE carrier aggregation case) and home SIM bands belonging to either LTE carrier aggregation band combination or non-carrier aggregation band combination). For carrier aggregation band combination, the protocol stack for eSIM may use RX0 640 and RX1 642, and the protocol stack for home SIM may use RX2 644, e.g., when RF is operating in dual receive full concurrency mode. For non-carrier aggregation band combination, the protocol stack for eSIM may use RX0 640 while the protocol stack for home SIM may use RX1 642, e.g., while RF is in dual receive diversity sharing mode. The eSIM band and home SIM band may belong to different low band groups and mid/high band groups can be used for RF full concurrency mode. The eSIM band and home SIM band may belong to the same band group (either low band group or mid/high band group), and the mobile device may use diversity sharing mode.

FIGS. 6B and 6C—Exemplary Operation

As one example, the mobile device 106 may operate in dual receive, full concurrency (or parallel) mode. Additionally, the protocol stack 650 may operate using a packet switched RAT (e.g., LTE) and protocol stack 655 may operate using a circuit switched RAT (e.g., GSM). When both protocol stack 650 and 655 operate in idle mode (monitoring for packet switched pages and circuit switched pages, respectively), the protocol stack 650 may control TRX0 640 and RX1 642, generally. When protocol stack 655 wakes up, e.g., in DRX, it may use RX2 644, as shown in FIG. 6B. When protocol stack 650 is in a data call and protocol stack 655 operates in idle mode, the protocol stack 655 may use TRX0 640 and RX1 642 while protocol stack 650 is sleeping. If carrier aggregation is implemented, protocol stack 650 may also use RX2 644 and RX3 646 while active. However, when protocol stack 655 wakes up, e.g., in DRX, it may use RX2 644 and protocol stack 650 may use TRX0 640 and RX1 642. When protocol stack 655 is involved in a voice call, it may use TRX0 640 and protocol stack 650 may be suspended.

As another example, the mobile device 106 may operate in dual receive, diversity sharing mode and the protocol stack 650 may operate using a packet switched RAT (e.g., LTE) and protocol stack 655 may operate using circuit switched RAT (e.g., GSM). When both protocol stacks 650 and 655 operate in idle mode (monitoring for packet switched pages and circuit switched pages, respectively), the protocol stack 650 may control TRX0 640 and RX1 642, generally. When protocol stack 655 wakes up, e.g., in DRX, it may use RX1 642 and switch to best antenna. When protocol stack 650 is involved in a data call and protocol stack 655 operates in idle mode, the protocol stack 650 may use TRX0 640 and RX1 642 while protocol stack 655 is sleeping. If carrier aggregation is implemented, protocol stack 650 may also use RX2 644 and RX3 646. However, when protocol stack 655 wakes up, e.g., in DRX, it may use RX1 642 and switch to the best antenna, while protocol stack 650 uses TRX0 640. FIG. 6C illustrates this case, where the best antenna is RX3 646. Similar to the previous example, when protocol stack 655 is in a voice call, it may use TRX0 640 and protocol stack 650 may be suspended.

Figure 7:
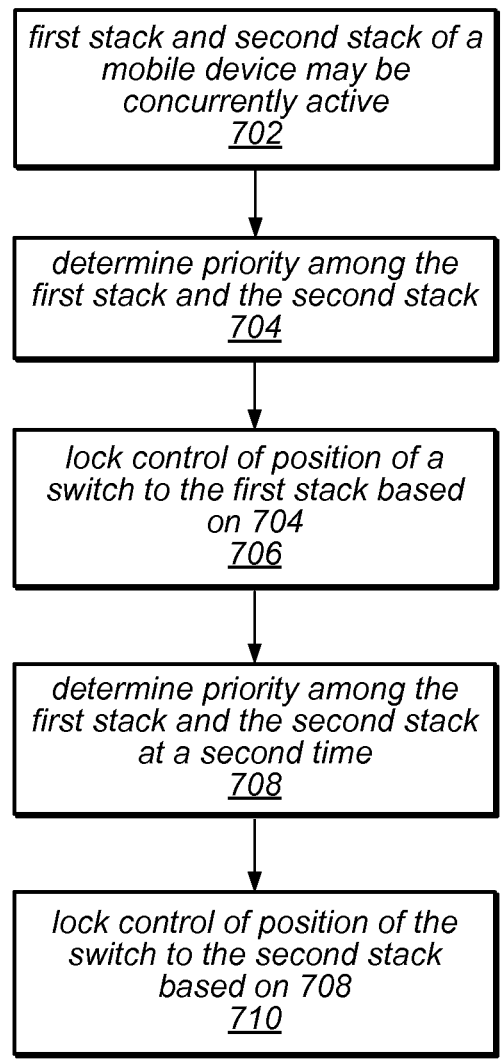
FIG. 7 is a flowchart diagram illustrating an example method for RF switching within wireless communication circuitry, according to some embodiments.

FIG. 7—Controlling Switch Position Amongst Multiple SIMs Based on Priority

FIG. 7 is a flowchart diagram illustrating a method for controlling switch position amongst multiple SIMs based on priority of service. The method shown in FIG. 7 may be used in conjunction with any of the systems or devices shown in the above Figures, among other systems or devices. In various embodiments, some of the method elements shown may be performed concurrently, in a different order than shown, or may be omitted. Note also that additional method elements may also be performed as desired. The method may be performed as follows.

In 702, a first stack and a second stack of the mobile device may be concurrently active. As indicated above, the first stack may be a first protocol stack associated with a first SIM of the mobile device, and the second stack may be a second protocol stack associated with a second SIM of the mobile device. The SIMs may be any of various SIMs (e.g., physical, eSIM, etc.), as desired. Each stack may be configured to use various radio circuitry of the mobile device to perform communication. For example, each stack may be configured to use one or more pairs of receive RF chains and/or TX chain(s), antennas, and/or other hardware to perform communication using any number of RATs, as desired. At any given time, each SIM may be configured to communicate using any number of communication types or modes, e.g., including circuit switched or packet switched communication, idle mode or connected mode (e.g., in a voice call or data session), or any desired combination thereof.

Thus, in 702, both stacks may be simultaneously active in communication using respective RAT(s). As discussed above, the stacks may be in a concurrently active in a parallel or full concurrency manner or may be concurrently active in a diversity-shared manner or mode, as desired.

In 704, at a first time, a priority may be determined among the first stack and the second stack. In some embodiments, the priority may be determined by comparing the type or mode of communication currently associated with the first stack and the second stack. For example, the priority of a stack using circuit switched communication may be higher than a stack using packet switched communication. As another example, priority of a stack in a voice call may be higher than a stack in a data session. As a further example, priority of a stack in a connected mode (e.g., for voice or data) may be higher than a stack in idle mode, e.g., at least in a sleep state, in some cases, page monitoring may have higher priority than a data session. In some embodiments, a stack which is in voice call, or in idle DRX mode monitoring for pages for circuit switched service, may have a higher priority than a stack which is in a packet switched call or in idle DRX mode for packet switched page monitoring. In one embodiment, the priority may be based on the RAT associated with each stack.

In some cases, the two stacks may have equal priority. For example, if both stacks are communicating in a packet-switched mode, they may have equal priority. In some embodiments, the stacks may have equal priority if one is in a packet-switched call and the other is in a packet-switched idle mode; alternatively, the packet-switched call stack may have higher priority than the packet-switched idle stack.

In 706, based on 704, control of the position of a switch may be locked to the first stack. Similar to discussions above, the switch may control the coupling of receive and/or transmit chains to antennas. Accordingly, when the first stack has a higher priority than the second stack (e.g., when communication associated with the first stack has a higher priority than communication associated with the second stack), control of the position of the switch may be locked to the first stack, e.g., the first stack may be allowed to modify the position of the switch while the second stack is prevented from changing the position of the switch. Thus, the first stack may intelligently determine which switch position may provide the best service for its communication, e.g., based on RF measurements associated with antennas of the mobile device.

In situations where the two stacks have equal priority, control of the switch may be alternated between the stacks. For example, they may alternate according to various schemes, such as round robin, among other possibilities. Thus, as one specific example, if the priority of the two stacks are the same and the second stack previously had control of the position of the switch (e.g., during the second stack's wake-up in DRX), then control of the position of the switch may be locked to the first stack based on the alternation scheme (e.g., during the first stack's wake-up in DRX).

In 708, at a second time, a priority may be determined among the first stack and the second stack. 708 may be performed similar to 704 above.

In 710, based on 708, control of the position of a switch may be locked to the second stack. 710 may operate similar to 706, except that in this instance the second stack may have higher priority than the first stack or it may be the second stack's turn in the alternation scheme (e.g., where the two stacks have equal priority).

In some embodiments, the first stack may have performed one or more RF measurements at or near the first time. After control of the switch position is released and granted to the second stack at the second time, the second stack may be configured to use the RF measurements performed by the first stack to select an antenna and/or switch position for the second stack, e.g., rather than performing new RF measurements, if desired.

Additionally, In some embodiments, when a stack is associated with an active circuit switched voice call, the other stack may be suspended.

VARIOUS EMBODIMENTS

The following paragraphs describe exemplary embodiments of the present disclosure.

One set of embodiments may include a method for controlling access to multiple antennas in a mobile device, comprising: at the mobile device: determining priority among a first protocol stack associated with a first subscriber identity module (SIM) in the mobile device and a second protocol stack associated with a second SIM in the mobile device; and locking control of a position of a switch to the first protocol stack based on said determining the priority among the first protocol stack and the second protocol stack, wherein the switch controls access to the multiple antennas, wherein the second protocol stack is unable to modify the position of the switch when control of the switch is locked to the first protocol stack.

According to some embodiments, the preceding method further comprises, wherein said determining priority comprises determining that a circuit switched radio access technology (RAT) associated with the first protocol stack is higher priority than a packet switched RAT associated with the second protocol stack.

According to some embodiments, the preceding method further comprises, wherein said determining priority comprises determining that an active voice call associated with the first protocol stack is higher priority than an idle mode associated with the second protocol stack.

According to some embodiments, the preceding method further comprises, wherein said determining priority comprises determining that an active circuit switched voice call associated with the first protocol stack is higher priority than an active data session associated with the second protocol stack.

According to some embodiments, the preceding method further comprises, wherein the active data session comprises a packet switched voice call.

According to some embodiments, the preceding method further comprises, wherein said determining priority comprises determining that the first protocol stack and the second protocol stack have equal priority, and wherein locking control of the switch to the first protocol stack is based on a alternation scheme between the two protocol stacks.

According to some embodiments, the preceding method further comprises, suspending the second protocol stack when an active, circuit switched voice call is associated the first protocol stack.

According to some embodiments, the preceding method further comprises, the first protocol stack performing one or more radio frequency (RF) measurements during a first period; after the first period, the first protocol stack unlocking control of the position of the switch; and the second protocol stack selecting a position of the switch based on the one or more RF measurements performed during the first period.

According to some embodiments, the preceding method further comprises, wherein the first protocol stack is associated with a circuit switched radio access technology (RAT) and the second protocol stack is associated with a packet switched RAT.

According to some embodiments, the preceding method further comprises, wherein the circuit switched RAT comprises global system for mobile communications (GSM) and wherein the packet switched RAT comprises long term evolution (LTE).

One set of embodiments may include a mobile device, comprising: at least a first antenna and a second antenna; a first pair of receive radio frequency (RF) chains, comprising a first receive RF chain and a second receive RF chain; a second pair of receive RF chains, comprising a third receive RF chain and a fourth receive RF chain; a transmit RF chain; a switch having at least a first position and a second position, wherein the position of the switch controls coupling between the first pair of receive RF chains, the second pair of receive RF chains, the first antenna, and the second antenna; a first subscriber identity module (SIM), wherein a first protocol stack is associated with the first SIM; a second SIM, wherein a second protocol stack is associated with the second SIM; a processing element coupled to the at least the first antenna and the second antenna, the first and second pairs of receive RF chains, the transmit RF chain, the switch, the first SIM, and the second SIM, wherein the processing element are configured to: determine a type of communication associated with the first protocol stack and the second protocol stack; and based on the determined type of communication, during a first period of time, allow the first protocol stack to modify the position of the switch while preventing the second protocol stack from modifying the position of the switch.

According to some embodiments, the preceding mobile device further comprises, wherein determining the type of communication associated with the first SIM and the second SIM comprises determining a circuit switched communication is associated with the first protocol stack and a packet switched communication is associated with the second protocol stack.

According to some embodiments, the preceding mobile device further comprises, wherein the circuit switched communication comprises an idle mode.

According to some embodiments, the preceding mobile device further comprises, wherein the circuit switched communication comprises a voice call.

According to some embodiments, the preceding mobile device further comprises, wherein the packet switched communication comprises an idle mode.

According to some embodiments, the preceding mobile device further comprises, wherein the packet switched communication comprises a voice call.

According to some embodiments, the preceding mobile device further comprises, wherein determining the type of communication associated with the first SIM and the second SIM comprises determining packet switched communication is associated with both the first protocol stack the second protocol stack.

According to some embodiments, the preceding mobile device further comprises, wherein the processing element is configured to alternate control of the switch position between the first protocol stack and the second protocol stack based on both protocol stacks being associated with packet switched communication.

One set of embodiments may include a non-transitory, computer accessible memory medium storing program instructions, wherein the program instructions are executable by a processor of a user mobile device to: determine a mode of communication associated with a first protocol stack and a second protocol stack, wherein the first protocol stack is associated with a first subscriber identity module (SIM) of the mobile device, and wherein the second protocol stack is associated with a second SIM; and based on the determined mode of communication, during a first period of time, allow the first protocol stack to modify the position of a switch while preventing the second protocol stack from modifying the position of the switch, wherein the position of the switch controls coupling between a first pair of receive chains, a second pair of receive chains, a first antenna, and a second antenna of the mobile device.

According to some embodiments, the program instructions are further executable to: determine a second mode of communication associated with the first protocol stack and the second protocol stack; and based on the determined second mode of communication, during a second period of time, allow the second protocol stack to modify the position of the switch while preventing the first protocol stack from modifying the position of the switch.

One set of embodiments may include a method that includes any action or combination of actions as substantially described herein in the Detailed Description.

One set of embodiments may include a method as substantially described herein with reference to each or any combination of FIG. 1 through the last Figure or with reference to each or any combination of paragraphs in the Detailed Description.

One set of embodiments may include a wireless device configured to perform any action or combination of actions as substantially described herein in the Detailed Description.

One set of embodiments may include a wireless device that includes any component or combination of components as described herein in the Detailed Description as included in a wireless device.

One set of embodiments may include a non-volatile computer-readable medium that stores instructions that, when executed, cause the performance of any action or combination of actions as substantially described herein in the Detailed Description.

One set of embodiments may include an integrated circuit configured to perform any action or combination of actions as substantially described herein in the Detailed Description.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a computer system may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The computer system may be realized in any of various forms. For example, the computer system may be a personal computer (in any of its various realizations), a workstation, a computer on a card, an application-specific computer in a box, a server computer, a client computer, a hand-held device, a user equipment (UE) device, a tablet computer, a wearable computer, etc.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A method of controlling access to multiple antennas in a mobile device, comprising:
at the mobile device:
determining priority among a first protocol stack associated with a first subscriber identity module (SIM) in the mobile device and a second protocol stack associated with a second SIM in the mobile device, wherein said determining priority comprises determining that an active circuit switched voice call associated with the first protocol stack is higher priority than an active data session associated with the second protocol stack; and
locking control of a position of a switch to the first protocol stack based on said determining the priority among the first protocol stack and the second protocol stack, wherein the switch controls access to the multiple antennas, wherein the second protocol stack is unable to modify the position of the switch when control of the switch is locked to the first protocol stack.

2. The method of claim 1, further comprising:
at a later time, determining priority among the first protocol stack and the second protocol stack, wherein said determining priority at the later time comprises determining that a circuit switched radio access technology (RAT) associated with the first protocol stack is higher priority than a packet switched RAT associated with the second protocol stack; and
locking control of the position of the switch based on the determined priority at the later time.

3. The method of claim 1, further comprising:
at a later time, determining priority among the first protocol stack and the second protocol stack, wherein said determining priority at the later time comprises determining that an active voice call associated with the first protocol stack is higher priority than an idle mode associated with the second protocol stack; and
locking control of the position of the switch based on the determined priority at the later time.

4. The method of claim 1, further comprising:
at a later time, determining priority among the first protocol stack and the second protocol stack, wherein said determining priority at the later time comprises determining that an active circuit switched voice call associated with the first protocol stack is higher priority than an active data session associated with the second protocol stack; and
locking control of the position of the switch based on the determined priority at the later time.

5. The method of claim 4, wherein the active data session comprises a packet switched voice call.

6. The method of claim 1, further comprising:
suspending the second protocol stack when the active, circuit switched voice call is associated the first protocol stack.

7. The method of claim 1, further comprising:
the first protocol stack performing one or more radio frequency (RF) measurements during a first period;
after the first period, the first protocol stack unlocking control of the position of the switch; and
the second protocol stack selecting a position of the switch based on the one or more RF measurements performed during the first period.

8. The method of claim 1, wherein the first protocol stack is associated with a circuit switched radio access technology (RAT) and the second protocol stack is associated with a packet switched RAT.

9. The method of claim 8, wherein the circuit switched RAT comprises global system for mobile communications (GSM) and wherein the packet switched RAT comprises long term evolution (LTE).

10. A mobile device, comprising:
at least a first antenna and a second antenna;
a first pair of receive radio frequency (RF) chains, comprising a first receive RF chain and a second receive RF chain;
a second pair of receive RF chains, comprising a third receive RF chain and a fourth receive RF chain;
a transmit RF chain;
a switch having at least a first position and a second position, wherein the position of the switch controls coupling between the first pair of receive RF chains, the second pair of receive RF chains, the first antenna, and the second antenna;
a first subscriber identity module (SIM), wherein a first protocol stack is associated with the first SIM;
a second SIM, wherein a second protocol stack is associated with the second SIM;
a processing element coupled to the at least the first antenna and the second antenna, the first and second pairs of receive RF chains, the transmit RF chain, the switch, the first SIM, and the second SIM, wherein the processing element are configured to:
determine a type of communication associated with the first protocol stack and the second protocol stack; and
based on the determined type of communication, during a first period of time, allow the first protocol stack to modify the position of the switch while preventing the second protocol stack from modifying the position of the switch.

11. The mobile device of claim 10, wherein determining the type of communication associated with the first SIM and the second SIM comprises determining a circuit switched communication is associated with the first protocol stack and a packet switched communication is associated with the second protocol stack.

12. The mobile device of claim 11, wherein the circuit switched communication comprises an idle mode.

13. The mobile device of claim 11, wherein the circuit switched communication comprises a voice call.

14. The mobile device of claim 11, wherein the packet switched communication comprises an idle mode.

15. The mobile device of claim 11, wherein the packet switched communication comprises a voice call.

16. The mobile device of claim 10, wherein determining the type of communication associated with the first SIM and the second SIM comprises determining packet switched communication is associated with both the first protocol stack the second protocol stack.

17. The mobile device of claim 16, wherein the processing element is configured to alternate control of the switch position between the first protocol stack and the second protocol stack based on both protocol stacks being associated with packet switched communication.

18. A non-transitory, computer accessible memory medium storing program instructions, wherein the program instructions are executable by a processor of a user mobile device to:
- determine a mode of communication associated with a first protocol stack and a second protocol stack, wherein the first protocol stack is associated with a first subscriber identity module (SIM) of the mobile device, and wherein the second protocol stack is associated with a second SIM; and
- based on the determined mode of communication, during a first period of time, allow the first protocol stack to modify the position of a switch while preventing the second protocol stack from modifying the position of the switch, wherein the position of the switch controls coupling between a first pair of receive chains, a second pair of receive chains, a first antenna, and a second antenna of the mobile device.

19. The non-transitory, computer accessible memory medium of claim 18, wherein the program instructions are further executable to:
- determine a second mode of communication associated with the first protocol stack and the second protocol stack; and
- based on the determined mode of communication, during a second period of time, allow the second protocol stack to modify the position of the switch while preventing the first protocol stack from modifying the position of the switch.

* * * * *